(12) United States Patent
Yang et al.

(10) Patent No.: US 10,114,147 B2
(45) Date of Patent: Oct. 30, 2018

(54) DEVICE FOR MONITORING TEMPERATURE RESPONSE TO STRESS CHANGE IN STRATA

(71) Applicant: SOUTH CHINA SEA INSTITUTE OF OCEANOLOGY, CHINESE ACADEMY OF SCIENCES, Guangzhou, Guangdong (CN)

(72) Inventors: Xiaoqiu Yang, Guangzhou (CN); Weiren Lin, Kochi (JP); Xin Zeng, Guangzhou (CN); Xiaobin Shi, Guangzhou (CN); Chuanhai Yu, Guangzhou (CN); Ziying Xu, Guangzhou (CN)

(73) Assignee: SOUTH CHINA SEA INSTITUTE OF OCEANOLOGY, CHINESE ACADEMY OF SCIENCES, Guangzhou, Guangdong (CN)

( * ) Notice: Subject to any disclaimer, the term of this patent is extended or adjusted under 35 U.S.C. 154(b) by 25 days.

(21) Appl. No.: 15/325,540

(22) PCT Filed: Mar. 9, 2016

(86) PCT No.: PCT/CN2016/076018
§ 371 (c)(1),
(2) Date: Jan. 11, 2017

(87) PCT Pub. No.: WO2017/140007
PCT Pub. Date: Aug. 24, 2017

(65) Prior Publication Data
US 2018/0031730 A1    Feb. 1, 2018

(30) Foreign Application Priority Data
Feb. 17, 2016    (CN) .......................... 2016 1 0089521

(51) Int. Cl.
*G01V 9/00*    (2006.01)
*G01K 1/08*    (2006.01)
(Continued)

(52) U.S. Cl.
CPC ............ *G01V 9/005* (2013.01); *E21B 47/065* (2013.01); *E21B 49/00* (2013.01); *G01K 1/08* (2013.01);
(Continued)

(58) Field of Classification Search
None
See application file for complete search history.

(56) References Cited

U.S. PATENT DOCUMENTS 3,728,660 A * 4/1973 Finney ..................... H01C 7/04
                                                    338/22 R
4,475,591 A * 10/1984 Cooke, Jr. ............... E21B 33/14
                                                     166/254.1
(Continued)

FOREIGN PATENT DOCUMENTS

CA    2 269 300 A1    10/2000
CN    1657924 A       8/2005
(Continued)

OTHER PUBLICATIONS

"Installation of Sacks-Evertson Borehole Strainmeters Network in Beijing-Tianjin Region", Earthquake Research in China, Dec. 1986, vol. 2, No. 4, pp. 104-106, (4 pages) with English Abstract.
(Continued)

*Primary Examiner* — Jill E Culler
(74) *Attorney, Agent, or Firm* — Westerman, Hattori, Daniels & Adrian, LLP

(57) ABSTRACT

A device for monitoring temperature response to stress change in strata, includes: a stress or strain sensor, disposed at the bottom of a borehole in the strata, encapsulated with
(Continued)

expansive cement, and detecting a stress change in the strata; a temperature response amplifying unit, disposed in the borehole and above the sensor, encapsulated with expansive cement, and configured to detect a temperature variation caused by the stress change and to amplify said temperature variation; a power controlling and data collecting module disposed outside the borehole and configured to supply power to the sensor and the temperature response amplifying unit and to collect the stress change and the amplified temperature variation. Silicone or rubber is used to encapsulate the temperature sensors, by which the temperature response to stress change in strata is amplified effectively.

3 Claims, 2 Drawing Sheets

(51) Int. Cl.
    *E21B 47/06*     (2012.01)
    *E21B 49/00*     (2006.01)
    *G01K 13/00*     (2006.01)
    *G01V 1/00*     (2006.01)
    *G01K 1/16*     (2006.01)

(52) U.S. Cl.
    CPC ............... *G01K 1/16* (2013.01); *G01K 13/00* (2013.01); *G01V 1/008* (2013.01)

(56) References Cited

U.S. PATENT DOCUMENTS

| | | | | |
|---|---|---|---|---|
| 4,727,239 A * | 2/1988 | Lupoli | ...................... | H05B 3/04 |
| | | | | 123/142.5 E |
| 5,265,680 A * | 11/1993 | Withers | .................. | E21B 17/14 |
| | | | | 166/242.8 |
| 6,429,784 B1 * | 8/2002 | Beique | .................... | E21B 17/14 |
| | | | | 166/250.07 |
| 2007/0241097 A1 * | 10/2007 | Shibata | ..................... | G04F 5/14 |
| | | | | 219/492 |

FOREIGN PATENT DOCUMENTS

| | | |
|---|---|---|
| CN | 1837858 A | 9/2006 |
| CN | 201213027 Y | 3/2009 |
| CN | 101539631 A | 9/2009 |
| CN | 101571491 A | 11/2009 |
| CN | 201488836 U | 5/2010 |
| CN | 102156294 A | 8/2011 |
| CN | 202483567 U | 10/2012 |
| CN | 202928708 U | 5/2013 |
| CN | 103454020 A | 12/2013 |
| WO | 00/49268 A1 | 8/2000 |

OTHER PUBLICATIONS

Chen et al., "A Phenomenon of Ground Temperature Change Prior to Lushan Earthquake Observed in Kangding", Seismology and Geology, Sep. 2013, vol. 35, No. 3, pp. 634-640 (7 pages) with English Abstract.

* cited by examiner

DEVICE FOR MONITORING TEMPERATURE RESPONSE TO STRESS CHANGE IN STRATA

TECHNICAL FIELD

The present invention relates to the technical field of monitoring of stress in strata, and particularly to a device for monitoring temperature response to stress change in strata.

BACKGROUND OF THE INVENTION

Tectonic activities in the earth's interior, such as volcanic eruption and earthquake, take place frequently accompanied by variations in temperature and stress. Thus, to carry out long-term monitoring on the temperature and stress in the earth's interior, and build thermal-solid coupling dynamical models of the active tectonic zones for analysis of the data obtained therefrom, will help to further understand the dynamical mechanism of the tectonic activities, and provide theoretical basis for earthquake prevention in active tectonic zones.

The main active tectonic zones, such as the Longmenshan Fault Zone, the Chelongpu Fault Zone, the San Andreas Fault Zone, the Nankai Trough and the Japan Trench subduction zone, are subjected to long-term borehole monitoring. At present, during the long-term borehole monitoring on the active tectonic zones, temperature sensors, and stress or strain sensors, are mounted in the boreholes for monitoring the variations of temperature, stress and strain, respectively. However, in our experiments on the temperature response of crustal rocks to the stress change, it was found that the adiabatic pressure derivative of temperature ($\beta=dT/dP$) of most crustal rocks are usually low (only 2-6 mK/MPa). But the resolutions of the current temperature measurements are of the order of mK. Thus the temperature response could be detected only when the change of stress or strain is relatively great.

It is therefore necessary to improve the existing devices for monitoring temperature response to stress change in strata.

SUMMARY OF THE INVENTION

The objective of the present invention is to provide a device for monitoring temperature response to stress change in strata, which can effectively amplify the temperature response to stress change. Thereby the resolutions of measurement on the Changes of stress and temperature are increased.

The technical solution of the present invention is as follows:

A device for monitoring temperature response to stress change in strata, comprising:

a stress or strain sensor arranged at a bottom of a borehole in the strata, for detecting stress change in strata;

a temperature response amplifying unit, filled in the borehole and above the stress or strain sensor, for detecting temperature variation caused by the stress change, and amplifying said temperature variation:

a power controlling and data collecting module, arranged outside the borehole, for supplying power to the stress or strain sensor and the temperature response amplifying unit, and collecting the stress change and the amplified temperature variation.

Said temperature response amplifying unit comprises: an encapsulating housing, and temperature sensors arranged respectively on a surface of the encapsulating housing and in a center of the encapsulating housing. The encapsulating housing is filled with silicone or rubber.

Said encapsulating housing is a columnar rubber sleeve.

The present invention provides the following advantages: The temperature sensors are encapsulated with silicone or rubber which has relatively high adiabatic pressure derivative of temperature (132.31 mK/MPa, two orders higher than those of the common rocks) and mounted at the bottom of borehole alone with the stress or strain sensor, and then tight connection between them and the strata is achieved by filling the gap therebetween with expansive cement. The temperature response to stress change in strata is therefore amplified effectively, and the resolution and sensitivity of the measurements on the variations of stress and temperature are increased. Moreover, the encapsulating process of the temperature sensors is simple and low-cost.

Figure 1:
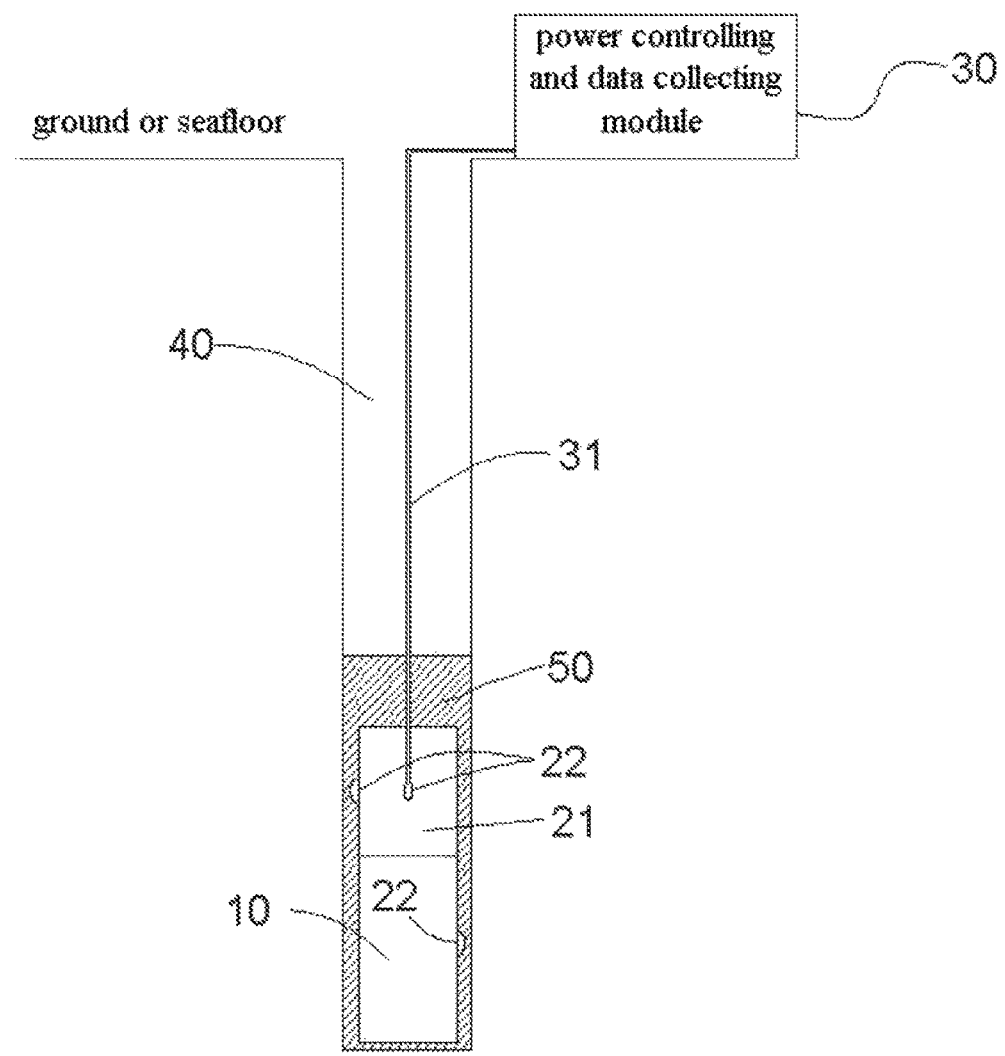
FIG. 1 is a schematic diagram of the present invention.

Reference characters in the drawings: 10: stress or strain sensor; 21: encapsulating housing; 22: temperature sensor; 30: power controlling and data collecting module; 31: load-bearing cable; 40: borehole; 50: expansive cement.

DETAILED DESCRIPTION OF THE EMBODIMENT

Further characteristics and advantages of the present invention will be more readily apparent from the below detailed description of the drawings and the embodiment.

Embodiment

Provided below is a device for monitoring temperature response to stress change in strata, as shown in FIG. 1, comprising:

a stress or strain sensor 10, arranged at the bottom of a borehole 40 in the strata and encapsulated with expansive cement, for detecting stress change of the strata;

a temperature response amplifying unit, mounted in the borehole 40 and above the stress or strain sensor 10, and encapsulated with expansive cement as well, for detecting temperature variation caused by the stress change, and amplifying the temperature variation;

a power controlling and data collecting module 30, arranged outside the borehole 40, for supplying power to the stress or strain sensor 10 and the temperature response amplifying unit, and collecting the stress change and the amplified temperature variation.

In the present embodiment, the temperature response amplifying unit comprises: an encapsulating housing 21, and temperature sensors 22 arranged respectively on a surface and in the center of the encapsulating housing 21. The encapsulating housing 21 is filled with silicone or rubber; the encapsulating housing 21 is a columnar rubber sleeve.

Specifically, the device for monitoring temperature response to stress change in strata in the present invention, mainly comprises: 1) a columnar rubber sleeve; 2) a stress or strain sensor 10; 3) three temperature sensors 22 with high stability and high resolution, encapsulated respectively in the center of the columnar rubber sleeve, on the surface of the columnar rubber sleeve, and at a surface of the stress or strain sensor 10; 4) a power controlling and data collecting module 30; and 5) a cable 31 applicable to deep borehole.

In practice, the load-bearing cable 31 is used to connect the temperature response amplifying unit in which the temperature sensors 22 are encapsulated, and the stress or strain sensor 10, to the power controlling and data collecting module 30. Then the temperature response amplifying unit, together with the stress or strain sensor 10, is sent downwards to the bottom of the borehole 40 slowly. Then tight connection between them and the strata is achieved by filling the gap therebetween with expansive cement 50, for detecting stress change in the strata and temperature response caused by the stress change.

In practice, the device for monitoring temperature response to stress change in strata in the present invention can be assembled and applied following the steps below:

Step 1: Mixing the raw materials of silicone or rubber in their practical proportion, pouring the mixture into a columnar rubber sleeve, and mounting temperature sensors 22 at the center and a surface of the columnar rubber sleeve respectively.

Step 2: Putting the columnar rubber sleeve, which is filled up with silicone and with the temperature sensors 22 mounted in it, into a vacuum chamber to remove the air in the silicone or rubber. Once the silicone or rubber is cured, encapsulation of the temperature sensors is achieved and thereby a temperature response amplifying unit is obtained.

Step 3: With a load-bearing cable 31, connecting a stress or strain sensor 10 and the temperature response amplifying unit respectively to a power controlling and data collecting module 30, and then mounting the stress or strain sensor 10 and the temperature response amplifying unit in strata (for example, sending them slowly to the bottom of a borehole 40 in the strata and mounting them there). Filling the gap between them and the strata with expansive cement 50 to achieve tight connection. Tuning on the power, setting the starting time for data collecting and the frequency and configuring the data collecting module, and thereby the device is able to carry out long-term monitoring.

In the present invention, temperature sensors 22 with high stability and high resolution are encapsulated with substance with relative high adiabatic pressure derivative of temperature (for example, silicone), by which a temperature response amplifying unit that is capable of effectively amplifying temperature response caused by the stress change in strata is obtained. The temperature response amplifying unit is then placed in the strata, together with a stress or strain sensor 10 (for example, a stress and strain gauge in the borehole 40), followed by the filling of expansive cement 50, to allow sensing and recording of variations of stress and temperature simultaneously in the same geological event (for example, an earthquake).

Figure 2:
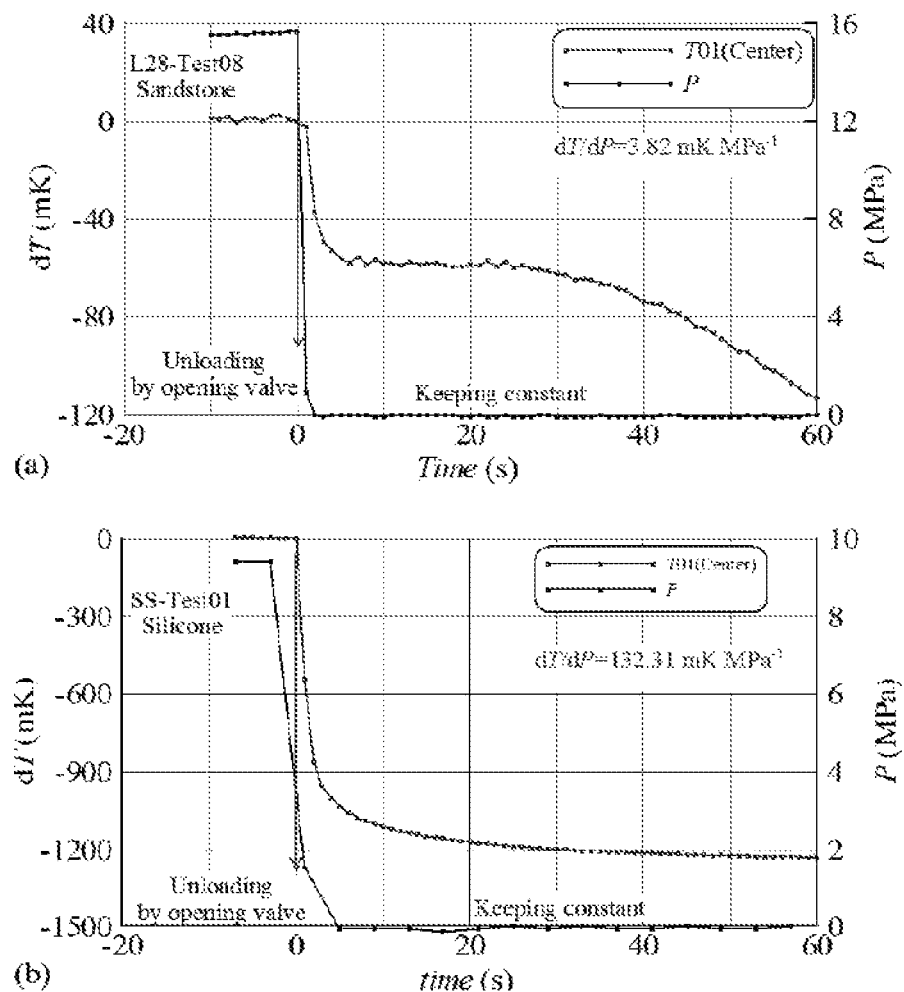
FIG. 2 shows temperature response curves of rapid unloading of typical sandstone and silicone.

FIG. 2(a) shows temperature response curves of rapid unloading of typical sandstone, while FIG. 2(b) shows temperature response curves of rapid unloading of silicone. The result indicates that, the adiabatic pressure derivative of temperature of silicone is up to 132.31 mK/MPa, which is two orders high than those of typical rocks (2-6 mK/MPa). The process, that encapsulating temperature sensors 22 having high stability and high resolution with silicone to obtain a columnar stress-temperature response amplifying unit, is simple. Moreover, silicone has very high watertightness and electrical insulation, and therefore additional treatment on the temperature sensors 22 encapsulated in silicone is not required. It is therefore demonstrated to be practicable and work stably.

The silicone used in the present invention for encapsulating the temperature sensors 22, can be replaced with other materials which have similar adiabatic pressure derivative of temperature and are also suitable for encapsulation, such as, rubber.

The above detailed description is a specific explanation for feasible embodiments of the present invention. The embodiments are not used for limiting the scope of the present invention. Any equivalent or changes made on the basis of the present invention shall fall within the scope of the present invention.

The invention claimed is:

1. A device for monitoring a temperature response to a stress change in a strata, comprising:
    a sensor, disposed at a bottom of a borehole in the strata, encapsulated with an expansive cement, and configured to detect the stress change in the strata;
    a temperature response amplifying unit, disposed in the borehole above the sensor, encapsulated with expansive cement, and configured to detect a temperature variation caused by the stress change and to amplify said temperature variation; and
    a power controlling and data collecting module, disposed outside the borehole, and configured to supply power to the sensor and the temperature response amplifying unit and to collect the stress change and the amplified temperature variation,
    wherein the temperature response amplifying unit comprises:
        an encapsulating housing which is a columnar rubber sleeve; and
        temperature sensors arranged respectively on a surface of the encapsulating housing and in a center of the encapsulating housing, the encapsulating housing being filled with a silicone or a rubber.

2. The device for monitoring the temperature response to the stress change in the strata according to claim 1, wherein the sensor is a stress sensor.

3. The device for monitoring the temperature response to the stress change in the strata according to claim 1, wherein the sensor is a strain sensor.

* * * * *